US010613758B2

(12) United States Patent
Cho et al.

(10) Patent No.: US 10,613,758 B2
(45) Date of Patent: Apr. 7, 2020

(54) MEMORY SYSTEM AND METHOD OF OPERATING THE SAME

(71) Applicant: SK hynix Inc., Gyeonggi-do (KR)

(72) Inventors: Young Ick Cho, Seoul (KR); Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/025,356

(22) Filed: Jul. 2, 2018

(65) Prior Publication Data

US 2019/0155514 A1 May 23, 2019

(30) Foreign Application Priority Data

Nov. 22, 2017 (KR) .................. 10-2017-0156605

(51) Int. Cl.
*G06F 3/06* (2006.01)
*G06F 12/1009* (2016.01)
*G06F 12/0802* (2016.01)

(52) U.S. Cl.
CPC .......... *G06F 3/0608* (2013.01); *G06F 3/0638* (2013.01); *G06F 3/0656* (2013.01); *G06F 3/0658* (2013.01); *G06F 3/0673* (2013.01); *G06F 12/0802* (2013.01); *G06F 12/1009* (2013.01); *G06F 2212/1044* (2013.01)

(58) Field of Classification Search
CPC .... G06F 3/0608; G06F 3/0638; G06F 3/0673; G06F 3/0658; G06F 3/0656; G06F 12/0802; G06F 12/1009; G06F 2212/1044
See application file for complete search history.

(56) References Cited

U.S. PATENT DOCUMENTS

| | | | | |
|---|---|---|---|---|
| 9,946,462 | B1* | 4/2018 | Li | G06F 3/0608 |
| 2017/0131925 | A1* | 5/2017 | Kim | G06F 3/0608 |
| 2017/0177497 | A1* | 6/2017 | Chun | G06F 12/0802 |
| 2017/0364446 | A1* | 12/2017 | Pham | G06F 12/1027 |
| 2018/0189000 | A1* | 7/2018 | Li | G06F 3/0608 |
| 2018/0217897 | A1* | 8/2018 | Nazari | G06F 11/1076 |
| 2018/0329632 | A1* | 11/2018 | Li | G06F 8/63 |
| 2019/0146910 | A1* | 5/2019 | Cho | G06F 12/0246 |
| | | | | 711/103 |

FOREIGN PATENT DOCUMENTS

| | | |
|---|---|---|
| KR | 1020140072639 | 6/2014 |
| KR | 101660190 | 9/2016 |

* cited by examiner

*Primary Examiner* — Hiep T Nguyen
(74) *Attorney, Agent, or Firm* — IP & T Group LLP

(57) ABSTRACT

Provided herein may be a memory system and a method of operating the memory system. The memory system may include: a semiconductor memory device to which an address mapping table including a plurality of map segments is stored; and a controller configured to load and store, during a read operation, one or more map segments selected from among the plurality of map segments. The controller may include: a compression engine configured to compress the one or more map segments and generate one or more compressed map segments and metadata corresponding thereto; a map data loading buffer configured to store the one or more compressed map segments and the metadata; and a processor configured to store the one or more compressed map segments to a random access memory (RAM) using the metadata.

18 Claims, 7 Drawing Sheets

FIG. 3

AMT

| Segment | Logical Address | Physical Address |
|---|---|---|
| S0 | LBA0 | PBA0 |
| | LBA1 | PBA1 |
| | ⋮ | ⋮ |
| | LBAm | PBAm |
| ⋮ | ⋮ | ⋮ |
| Sn | LBA0 | PBA0 |
| | LBA1 | PBA1 |
| | ⋮ | ⋮ |
| | LBAm | PBAm |

L2P entry

A data storage device used as a memory device provides
MEMORY SYSTEM AND METHOD OF OPERATING THE SAME

CROSS-REFERENCE TO RELATED APPLICATION

The present application claims priority under 35 U.S.C. § 119(a) to Korean patent application number 10-2017-0156605, filed on Nov. 22, 2017, which is incorporated herein by reference in its entirety.

BACKGROUND

1. Field of Invention

Various embodiments of the present disclosure generally relate to a memory system and a method of operating the memory system. Particularly, the embodiments relate to a memory system configured to manage map data, and a method of operating the memory system.

2. Description of Related Art

Recently, the paradigm computer environment has shifted to ubiquitous computing in which computer systems can be used anytime and anywhere. As a result, the use of portable electronic devices such as mobile phones, digital cameras, and laptop computers has rapidly increased. In general, such portable electronic devices use a memory system which employs a memory or data storage device. The data storage device is used as a main memory device or an auxiliary memory device of the portable electronic devices.

A data storage device used as a memory device provides advantages such as excellent stability and durability, high information access speed, and low power consumption, since there is no mechanical driving part. Examples of a data storage device used as the memory system having such advantages may include a universal serial bus (USB) memory device, a memory card having various interfaces, and a solid state drive (SSD).

SUMMARY

Various embodiments of the present disclosure are directed to a memory system capable of efficiently managing map data, and a method of operating the memory system.

An embodiment of the present disclosure may provide for a memory system including: a semiconductor memory device to which an address mapping table including a plurality of map segments is stored; and a controller configured to load and store, during a read operation, one or more map segments selected from among the plurality of map segments. The controller may include: a compression engine configured to compress the one or more map segments and generate one or more compressed map segments and metadata corresponding thereto; a map data loading buffer configured to store the one or more compressed map segments and the metadata; and a processor configured to store the one or more compressed map segments to a random access memory (RAM) using the metadata.

An embodiment of the present disclosure may provide for a memory system including: a semiconductor memory device to which an address mapping table including a plurality of map segments is stored; and a controller configured to control the semiconductor memory device to store, during a read operation, one or more compressed map segments obtained through a compression operation of compressing one or more map segments, selected from among the plurality of map segments, and metadata obtained during the compression operation, to map data loading buffer.

An embodiment of the present disclosure may provide for a method of operating a memory system, including: loading map segments stored in a semiconductor memory device using a controller; compressing the loaded map segments using a compression engine, generating compressed map segments and metadata respectively corresponding to the compressed map segments, and storing the compressed map segments and the metadata to a map data loading buffer; and allocating, using a processor, a space to a random access memory (RAM) in response to the metadata, and copying and storing the compressed map segments to the allocated space.

An embodiment of the present disclosure may provide for a memory system including: a memory device configured to store a plurality of map segments each including a logical address and a corresponding physical address; and a controller configured to: control the memory device to read out one or more of the plurality of map segments, one of which has a read-requested logical address; compress the read out one or map segments and buffer the compressed one or more map segments therein; decompress the compressed map segment having the read-requested logical address among the one or more compressed map segments to generate a decompressed map segment; and control the memory device to perform a read operation according to the physical address corresponding to the read-requested logical address in the decompressed map segment.

BRIEF DESCRIPTION OF THE DRAWINGS

FIG. 3 is a diagram illustrating an exemplary configuration of an address mapping table shown in FIG. 1.

DETAILED DESCRIPTION

Figure 1:
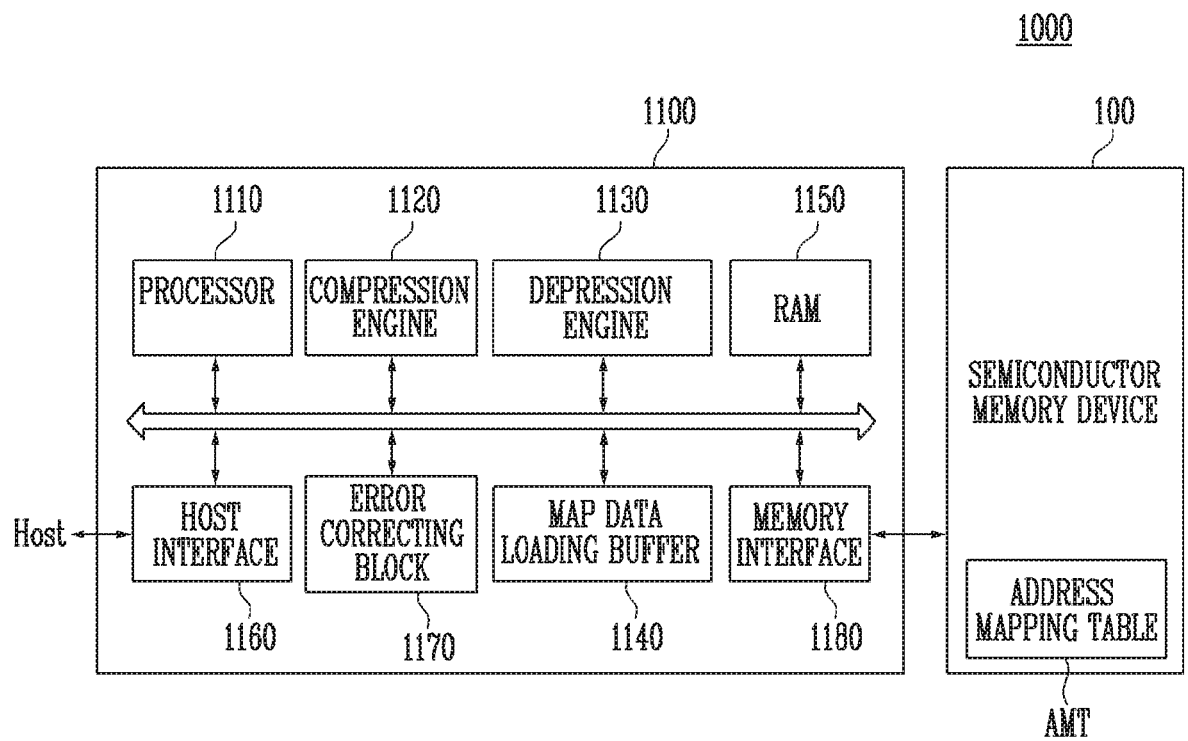
FIG. 1 is a block diagram illustrating a memory system in accordance with an embodiment of the present disclosure.

Various embodiments will now be described more fully hereinafter with reference to the accompanying drawings; however, elements and features of the present disclosure may be embodied in different forms than shown and described herein. Thus, the present invention is not limited to the embodiments set forth herein. Rather, these embodiments are provided so that this disclosure is thorough and complete and fully conveys the scope of the embodiments to those skilled in the art. In the description below, reference to "an embodiment" is not necessarily to only one embodiment, and different references to "an embodiment" are not necessarily to the same embodiment(s).

In the drawings, dimensions may be exaggerated for clarity. It will be understood that when an element is referred to as being "between" two elements, it can be the only element between the two elements, or one or more intervening elements may also be present.

The drawings are not necessarily to scale and, in some instances, proportions may have been exaggerated in order to clearly illustrate features of the embodiments.

Embodiments are described herein with reference to schematic and sectional illustrations. Variations in the shape of components and regions therein as a result, for example, of manufacturing techniques and/or tolerances are to be expected. Thus, embodiments should not be construed as limited to any particular shapes of components or regions therein. In the drawings, lengths and sizes of layers and regions may be exaggerated for clarity. Like reference numerals in the drawings denote like elements.

Terms such as "first" and "second" may be used to identify various components, but they should not limit the various components. Those terms are only used for the purpose of differentiating a component from other components that otherwise have the same name. For example, a first component may be referred to as a second component, and a second component may be referred to as a first component without departing from the spirit and scope of the present disclosure. Furthermore, "and/or" may include any one of or a combination of the components mentioned.

Furthermore, a singular form may include a plural from and vice versa, unless the context requires otherwise. Furthermore, "include/comprise" or "including/comprising" used in the specification means the one or more stated components, steps, operations, and/or elements but does not preclude inclusion of additional unstated component(s), step(s), operation(s), and/or element(s).

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through one or more intermediate components. On the other hand, "directly connected/directly coupled" refers to one component directly coupling another component without an intermediate component.

FIG. 1 is a block diagram illustrating a memory system 1000 in accordance with an embodiment of the present disclosure.

Referring FIG. 1, the memory system 1000 may include a semiconductor memory device 100 and a controller 1100.

The semiconductor memory device 100 may perform operations such as a read operation, a write operation, an erase operation, and a background operation under control of the controller 1100. The semiconductor memory device 100 may include a plurality of memory blocks. At least one memory block of the plurality of memory blocks may be defined as a system block in which an address mapping table AMT is stored. The address mapping table AMT may have the form of a table to which a logical block address (LBA) received from a host and a physical block address (PBA) corresponding to the LBA are mapped and stored. Furthermore, the plurality of memory blocks of the semiconductor memory device 100 may store data through a program operation. The stored data may be output to the controller 1100 through a read operation.

The controller 1100 is coupled to a host (Host) and the semiconductor memory device 100. The controller 1100 may access the semiconductor memory device 100 in response to a request from the host. For example, the controller 1100 may control a read operation, a write operation, an erase operation, and a background operation of the semiconductor memory device 100. The controller 1100 may provide an interface between the host and the semiconductor memory device 100. The controller 1100 may drive firmware for controlling the semiconductor memory device 100.

The controller 1100 may include a processor 1110, a compression engine 1120, a decompression engine 1130, a map data loading buffer 1140, a random access memory (RAM) 1150, a host interface 1160, an error correcting block 1170, and a memory interface 1180.

The processor 1110 may control the overall operation of the controller 1100, and control a program operation, a read operation, or an erase operation of the semiconductor memory device 100. The processor 1110 may operate according to firmware stored in the RAM 1150.

Under control of the processor 1110, the compression engine 1120 may read and compress map segments stored in the system block of the semiconductor memory device 100, and output the compressed map segments and metadata including information about the size of the compressed map segments obtained during a compression operation. The compressed map segments and the metadata may be stored to the map data loading buffer 1140. The compression engine 1120 may compress a plurality of map segments in a plurality of sizes to increase the efficiency of the compression operation. The compression engine 1120 may compress a plurality of map segments in different sizes, for example, compress the map segments in various sizes such that the compressed sizes thereof may be 1 K, 512 byte, 256 byte, 128 byte, 64 byte, 32 byte, 16 byte, or other suitable size.

The decompression engine 1130 may perform a depression operation on compressed map segments among the map segments cached to the RAM 1150. The processor 1110 may control the operation of the semiconductor memory device 100 to read, with reference to decompressed map data, data stored in a storage location corresponding to a read address which is received from the host.

The map data loading buffer 1140 may store the compressed map segments and the metadata that are output from the compression engine 1120. The processor 1110 may copy the compressed map segments from the map data loading buffer 1140 into the RAM 1150 using the metadata stored in the map data loading buffer 1140.

The RAM 1150 may store firmware and be used as an operating memory for the processor 1110, a cache memory between the semiconductor memory device 100 and the host, and a buffer memory between the semiconductor memory device 100 and the host. The firmware may include an algorithm for performing any or all of the operations in connection with managing map data. The compressed map segments stored in the map data loading buffer 1140 may be copied and stored to the RAM 1150. The RAM 1150 may include a map cache buffer configured to store the compressed map segments. Furthermore, the RAM 1150 may store map segments decompressed by the decompression engine 1130.

The host interface 1160 may include a protocol for performing data exchange between the host and the controller 1100. In an embodiment, the controller 1200 may communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, and a private protocol.

The error correcting block 1170 may use an error correcting code (ECC) to detect and correct an error in data received from the semiconductor memory device 100. For example, the error correction block 1170 may compare the number of bits of the detected error with the maximum allowed number of ECC bits and correct the detected error when the number of bits of the detected error is less than the maximum allowed number of ECC bits.

The memory interface 80 may interface with the semiconductor memory device 100. For example, the memory interface may include a NAND interface or a NOR interface.

The controller 1100 and the semiconductor memory device 100 may be integrated into a single semiconductor device to form a solid state drive (SSD). The SSD may include a storage device configured to store data to a semiconductor memory. When the memory system 1000 is used as an SSD, the operating speed of the host coupled to the memory system 1000 may improve.

In an embodiment, the memory system 1000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the semiconductor memory device 100 or the memory system 1000 may be embedded in various types of packages. For example, the semiconductor memory device 100 or the memory system 1000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

In an embodiment of the present disclosure, when a read request is received from the host, the memory system 1000 may read map segments of the address mapping table AMT stored in the semiconductor memory device 100 and compress the map segments. In addition, the memory system 1000 may store the compressed map segments and metadata obtained during the compression operation to the map data loading buffer 1140. Thereafter, the processor 1110 may store the compressed map segments to the RAM 1150 using the metadata. Therefore, the processor 1110 may not store metadata, so that memory consumption may be reduced, and the design of the firmware may be simple.

Figure 2:
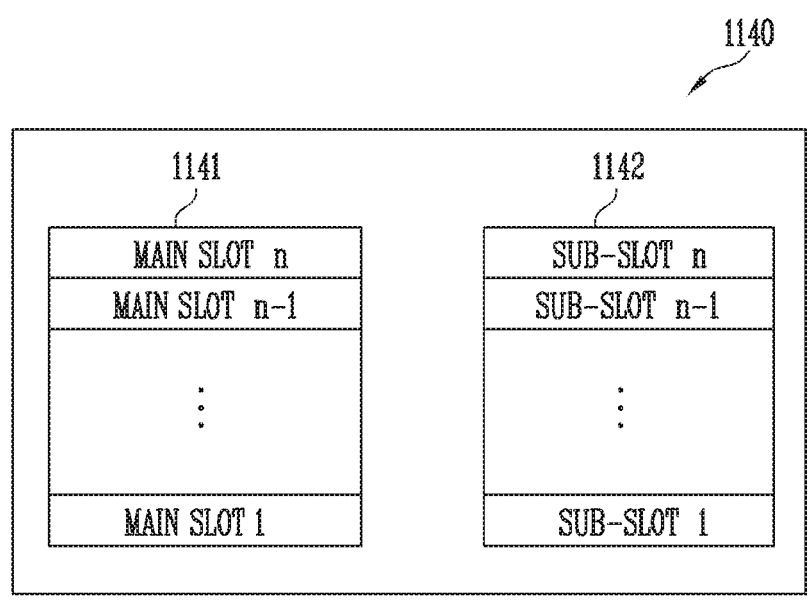
FIG. 2 is a block diagram illustrating an exemplary configuration of a map data loading buffer shown in FIG. 1.

FIG. 2 is a block diagram illustrating a configuration of the map data loading buffer 1140 shown in FIG. 1.

Referring to FIG. 2, the map data loading buffer 1140 may include a main slot unit 1141 and a sub-slot unit 1142.

The main slot unit 1141 may store compressed map segments output from the compression engine 1120 of FIG. 1. The main slot unit 1141 may include a plurality of main slots MAIN SLOT 1 to MAIN SLOT n (hereinafter, referred to as 'main slots 1 to n'). Each of the main slots 1 to n may store a compressed map segment output from the compression engine 1120.

The sub-slot unit 1142 may store metadata corresponding to each of the compressed map segments obtained during the compression operation of the compression engine 1120 of FIG. 1. The sub-slot unit 1142 may include a plurality of sub-slots SUB-SLOT 1 to SUB-SLOT n (hereinafter, referred to as 'sub-slots 1 to n'). The sub-slots 1 to n may respectively correspond to the main slots 1 to n of the main slot unit 1141. Each of the sub-slots 1 to n may store metadata corresponding to a compressed map segment stored in a corresponding one of the main slots 1 to n.

FIG. 3 is a diagram illustrating a configuration of the address mapping table AMT to be stored to the system block shown in FIG. 1.

Referring to FIG. 3, the address mapping table AMT may include a on plurality of map segments S0 to Sn. Each of the map segments S0 to Sn may include a plurality of logical block addresses LBA0 to LBAm and a plurality of physical block addresses PBA0 to PBAm corresponding to the respective logical block addresses LBA0 to LBAm. If one logical block address LBA and one physical block address PBA mapped thereto are referred to as a logical to physical (L2P) entry, each of the map segments S0 to Sn may include m L2P entries.

The L2P entries of the address mapping table AMT may be updated. For example, the L2P entries stored in the address mapping table AMT may be updated each time the sum of sizes of data, such as program data, requested from the host becomes a preset size or there is no empty space in the RAM 1150 to which physical to logical (P2L) entries are stored. However, updating the L2P entries in the address mapping table AMT is not specifically limited to this particular time or event.

Figure 4:
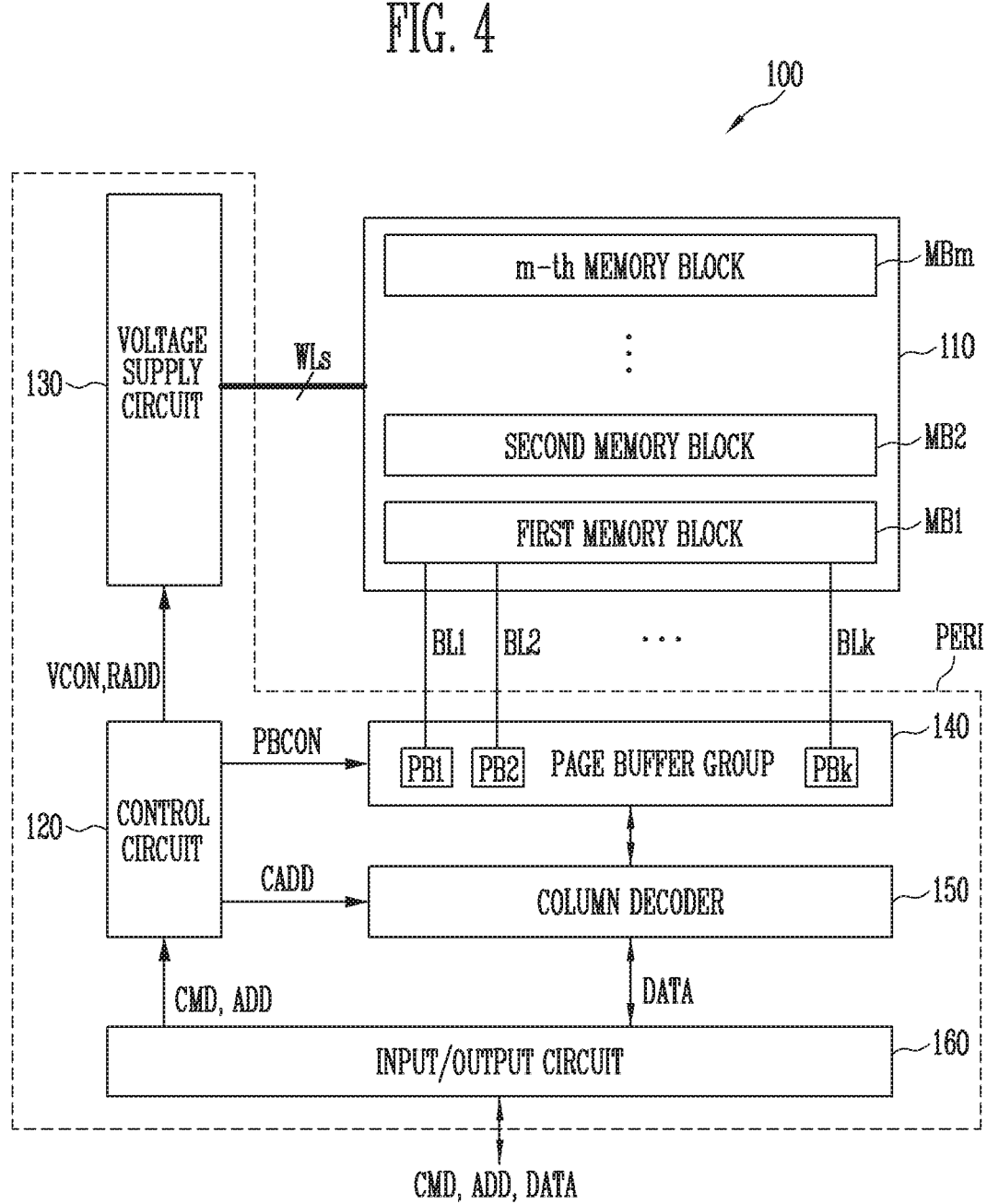
FIG. 4 is a block diagram illustrating an exemplary configuration of a semiconductor memory device shown in FIG. 1.

FIG. 4 is a block diagram illustrating the semiconductor memory device 100 shown in FIG. 1.

Referring to FIG. 4, the semiconductor memory device 100 in accordance with an embodiment of the present disclosure may include a memory cell array 110 including first to m-th memory blocks MB1 to MBm, and a peripheral circuit PERI configured to perform a program operation and a read operation on memory cells included in a selected page of the memory blocks MB1 to MBm. The peripheral circuit PERI may include a control circuit 120, a voltage supply circuit 130, a page buffer group 140, a column decoder 150, and an input/output circuit 160.

Among the first to m-th memory blocks MB1 to MBm in the memory cell array 110, at least one memory block (e.g., MB1) may be defined as the system block of FIG. 2. The system block may store the address mapping table AMT described with reference to FIG. 3. Furthermore, the second to m-th memory blocks MB2 to MBm may be defined as normal memory blocks. The normal memory blocks may store data.

The controller circuit 120 may output a voltage control signal VCON for generating a voltage needed to perform a program operation or a read operation in response to a command CMD input from an external device through the input/output circuit 160, and output a control signal PBCON for controlling page buffers PB1 to PBk in the page buffer group 140 depending on the type of operation. Furthermore, the control circuit 120 may output a row address signal RADD and a column address signal CADD in response to an address signal ADD input from an external device through the input/output circuit 160.

The voltage supply circuit 130 may supply operating voltages needed for a program operation, a read operation, and an erase operation of memory cells to local lines of the selected memory block including a drain select line, word lines WLs, and a source select line, in response to the voltage control signal VCON of the control circuit 120. The voltage supply circuit 130 may include a voltage generating circuit and a row decoder.

The voltage generating circuit may output the operating voltages needed for the program operation, the read operation, or the erase operation of the memory cells to global lines, in response to the voltage control signal VCON of the control circuit 120.

The row decoder may couple, in response to row address signals RADD of the control circuit 120, the global lines to the local lines such that the operating voltages output from the voltage generating circuit to the global lines may be transmitted to the local lines of the selected memory block in the memory cell array 110.

The page buffer group 140 includes a plurality of page buffers PB1 to PBk coupled with the memory cell array 110 through bit lines BL1 to BLk. In response to a control signal PBCON of the control circuit 120, the page buffers PB1 to PBk of the page buffer group 140 may selectively precharge the bit lines BL1 to BLk depending on input data so as to store the data to the memory cells, or sense voltages of the bit lines BL1 to BLk so as to read out data from the memory cells.

The column decoder 150 may select the page buffers PB1 to PBk included in the page buffer group 140 in response to a column address signal CADD output from the control circuit 120. In other words, the column decoder 150 may successively transmit data to be stored to the memory cells, to the page buffers PB1 to PBk in response to the column address signal CADD. Furthermore, during a read operation, the column decoder 150 may successively select the page buffers PB1 to PBk in response to a column address signal CADD such that data of memory cells latched to the page buffers PB1 to PBk may be output to the external device.

During a program operation, the input/output circuit 160 may transmit data input from the external device to store the data to the memory cells, to the column decoder 150 under control of the control circuit 120 so that the data may be input to the page buffer group 140. When the column decoder 150 transmits the data received from the input/output circuit 160 to the page buffers PB1 to PBk of the page buffer group 140, the page buffers PB1 to PBk may store the input data to internal latch circuits thereof. During a read operation, the input/output circuit 160 may output, to the external device, data transmitted from the page buffers PB1 to PBk of the page buffer group 140 through the column decoder 150.

During a map segment read operation, the semiconductor memory device 100 in accordance with an embodiment of the present disclosure may read the map segments of the address mapping table AMT stored in the system block (e.g., MB1) and output the map segments to the controller 1100 of FIG. 1.

Furthermore, the address mapping table AMT stored in the system block (e.g., MB1) may be updated.

Figure 5:
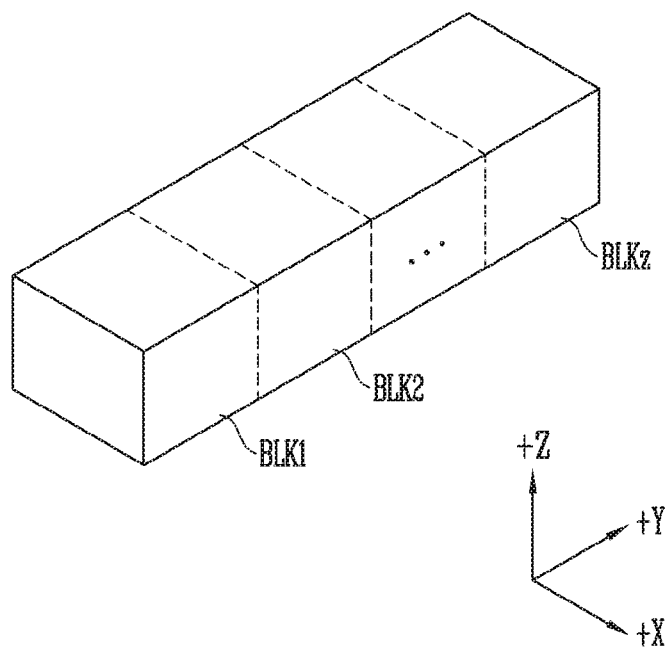
FIG. 5 is a block diagram illustrating an example of a memory cell array of FIG. 4.

FIG. 5 is a block diagram illustrating an example of a memory cell array 110 of FIG. 4.

Referring to FIG. 5, the memory cell array 110 includes the plurality of memory blocks BLK1 to BLKz. Each memory block has a three-dimensional (3D) structure. Each memory block may include a plurality of memory cells stacked on a substrate. The memory cells are arranged in a +X direction, a +Y direction, and a +Z direction. The structure of each memory block will be described in more detail with reference to FIG. 6.

Figure 6:
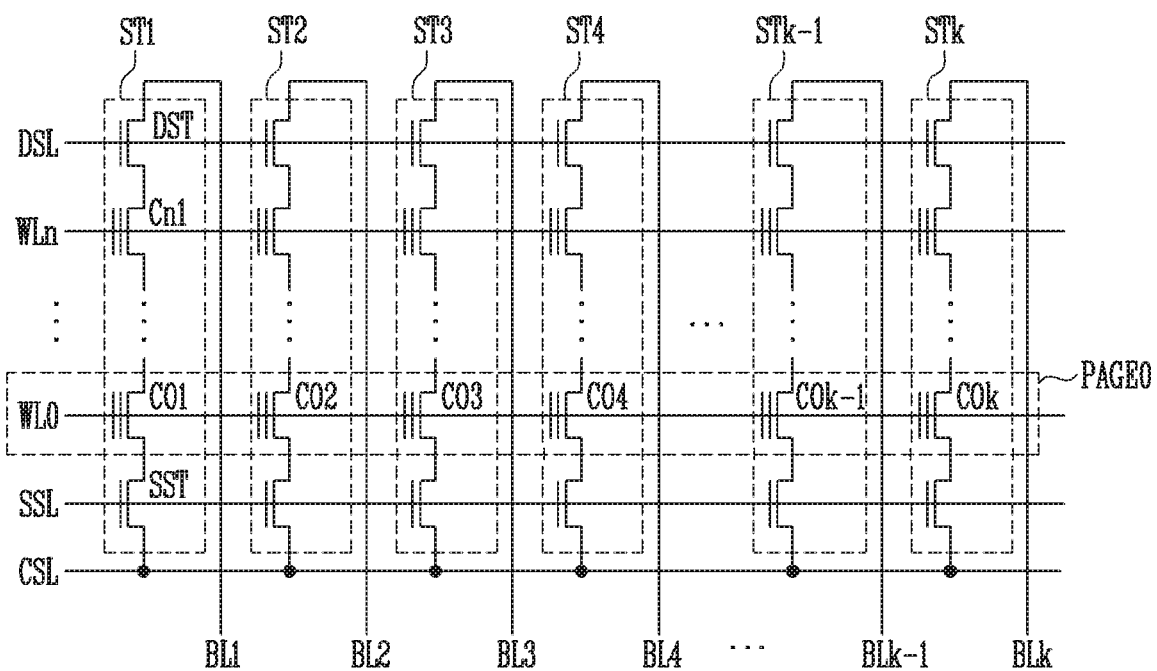
FIG. 6 is a circuit diagram illustrating an example of a memory block shown in FIG. 5.

FIG. 6 is a circuit diagram illustrating a memory block among the plurality of memory blocks BLK1 to BLKz shown in FIG. 5.

Referring to FIG. 6, each memory block may include a plurality of strings ST1 to STk coupled between the bit lines BL1 to BLk and a common source line CSL. In other words, the strings ST1 to STk may be respectively coupled with the bit lines BL1 to BLk and coupled in common with the common source line CSL. Each string, e.g., ST1, may include a source select transistor SST having a source coupled to the common source line CSL, a plurality of memory cells C01 to Cn1, and a drain select transistor DST having a drain coupled to the bit line BL1. The memory cells C01 to Cn1 may be coupled in series between the select transistors SST and DST. A gate of the source select transistor SST may be coupled to the source select line SSL. Gates of the memory cells C01 to Cn1 may be respectively coupled to the word lines WL0 to WLn. A gate of the drain select transistor DST may be coupled to the drain select line DSL.

The memory cells in the memory block may be divided on a physical page basis or on a logical page basis. For example, memory cells C01 to C0k coupled to a single word line (e.g., WL0) may form a single physical page PAGE0. A page may be the basic unit of a program operation or a read operation.

Figure 7:
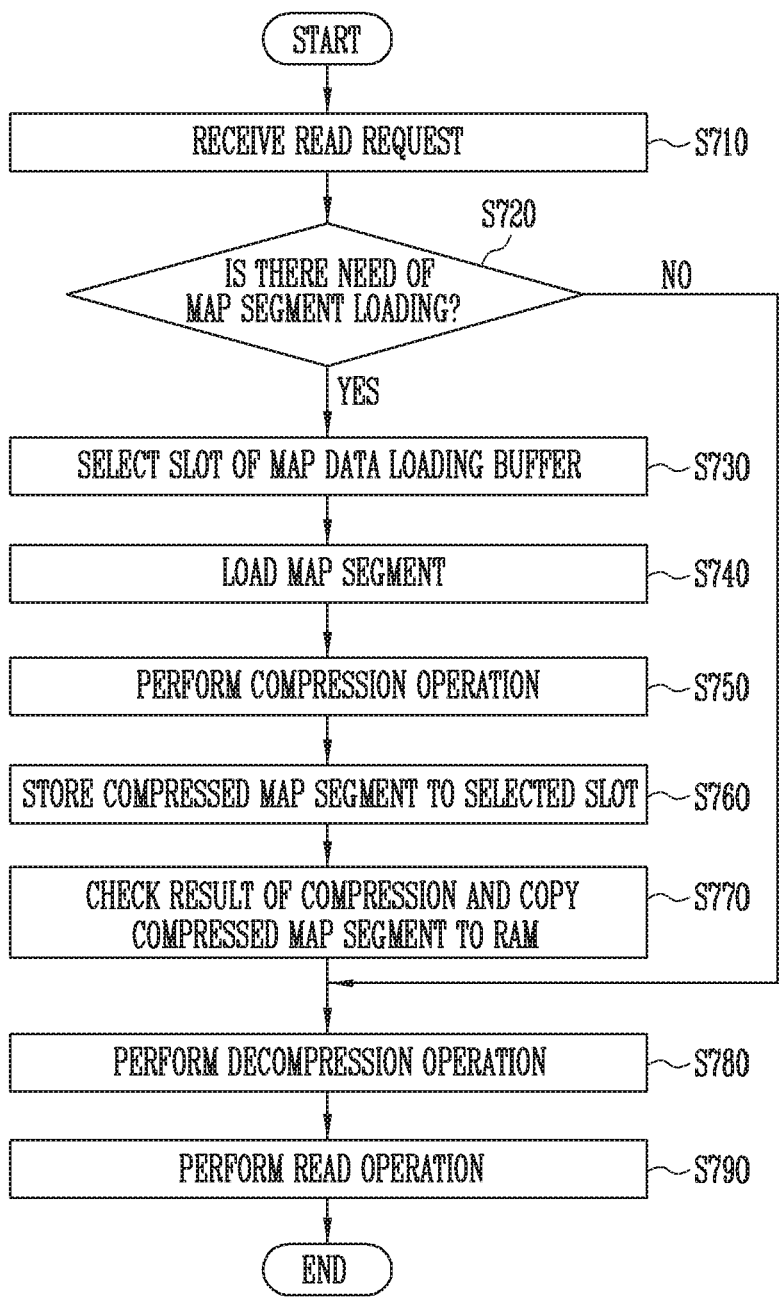
FIG. 7 is a flowchart describing an operation of the memory system in accordance with an embodiment of the present disclosure.

FIG. 7 is a flowchart describing an operation of the memory system 1000 in accordance with an embodiment of the present disclosure.

A method of operating the semiconductor system 1000 in accordance with an embodiment of the present disclosure will be described with reference to FIGS. 1 to 7.

At step S710, a read request is received from the host. A read address may be received along with the read request.

At step S720, the processor 1110 may determine whether to perform an operation of loading a map segment. The processor 1110 may scan the RAM 1150 to check whether a map segment including an L2P entry corresponding to the read address (i.e., a logical block address) that has been received from the host has been cached to the map cache buffer.

If the map segment including the L2P entry corresponding to the read address has been cached to the map cache buffer ("NO" at step S720), it may be determined that there is no need to perform the operation of loading the map segment.

If the map segment including the L2P entry corresponding to the read address has not been cached to the map cache buffer ("YES" at step S720), it may be determined to perform the operation of loading the map segment including the L2P entry corresponding to the read address from the system block of the semiconductor memory device 100.

If it is determined that there is no need to perform the operation of loading the map segment ("NO" at step S720), step S780, which is a decompression operation described in more detail below, may be performed. If it is determined to perform the operation of loading the map segment ("YES" at step S720), step S730 may be performed.

At step S730, the processor 1110 may select an empty main slot of the main slot unit 1141 of the map data loading buffer 1140. For example, the processor 1110 may select at least one empty main slot among the main slots 1 to n included in the main slot unit 1141.

The processor 1110 may control the semiconductor memory device 100 and load map segments stored in the system block at step S740. Here, with regard to the map segments to be loaded, not only the map segment including the L2P entry corresponding to the read address in response to the request from the host, but also as many map segments as possible may be loaded.

At step S750, the compression engine 1120 may generate compressed map segments by compressing the map segments loaded from the semiconductor memory device 100. During the compression operation, metadata corresponding to the respective compressed map segments may be generated. The metadata may include information about whether the corresponding compressed map segments have been compressed and the sizes of the compressed map segments.

The compressed map segments generated by the compression engine 1120 and the metadata corresponding thereto may be stored to the map data loading buffer 1140 at step S760. For example, the compressed map segments may be stored to one or more empty main slots selected at step S730. The metadata may be stored to one or more sub-slots corresponding to the one or more selected empty main slots.

At step S770, the processor 1110 may check metadata stored in the one or more sub-slots, and copy and store the compressed map segments stored in the one or more main slots to the map cache buffer of the RAM 1150. Here, the processor 1110 may check the sizes of the compressed map segments stored in the main slot(s) using the metadata and allocate a space corresponding to the sizes of the compressed map segments to the map cache buffer, and then copy and store the compressed map segments to the allocated space.

At step S780, the processor 1110 may perform an operation of decompressing the map segment including the L2P entry corresponding to the read address, among the compressed map segments stored in the map cache buffer of the RAM 1150. Here, the processor 1110 may check the metadata corresponding to the map segment including the L2P entry and check whether the map segment has been compressed. If the map segment has not been compressed, the map segment may be used as it is, without decompressing it. The decompressed map segment may be stored to the RAM 1150.

The processor 1110 may control the semiconductor memory device 100 to check a physical address corresponding to the read address, i.e., a logical address, from the L2P entries of the decompressed map segment, and read the data stored in the corresponding physical address. The semiconductor memory device 100 may perform a read operation and output read data to the controller 1100, at step S790. The controller 1100 may output the read data to the host.

In the above-described embodiments, an example in which map segments stored in the semiconductor memory device 100 are loaded and compressed is provided, but the present disclosure is not limited thereto. The present disclosure may also be applied to the case in which data stored in the memory blocks MB2 to MBm of the semiconductor memory device 100 is loaded and compressed.

Figure 8:
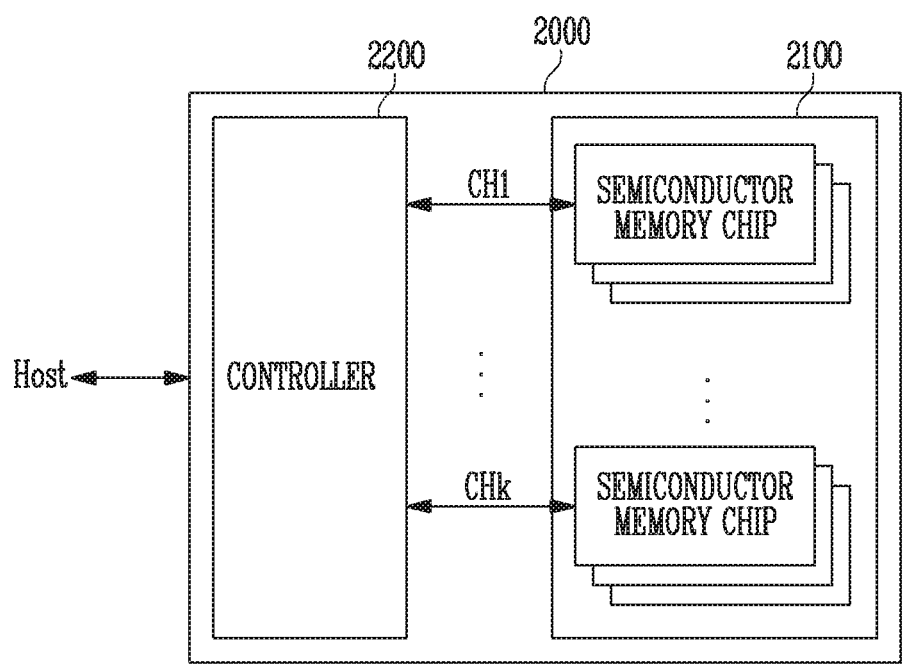
FIG. 8 is a block diagram illustrating an application example of the memory system of FIG. 1.

FIG. 8 is a block diagram illustrating an application example of the memory system of FIG. 1.

Referring FIG. 8, a memory system 2000 may include a semiconductor memory device 2100 and a controller 2200. The semiconductor memory device 2100 includes a plurality of memory chips. The semiconductor memory chips may be divided into a plurality of groups.

In FIG. 8, it is illustrated that the plurality of groups respectively communicate with the controller 2200 through first to k-th channels CH1 to CHk. Each semiconductor memory chip may have the same configuration and operation as the semiconductor memory device 100 described with reference to FIG. 1.

Each group of semiconductor chips may communicate with the controller 2200 through one common channel. The controller 2200 may have the same configuration as that of the controller 1100 described with reference to FIG. 1 and may control a plurality of memory chips of the semiconductor memory device 2100 through the plurality of channels CH1 to CHk.

Figure 9:
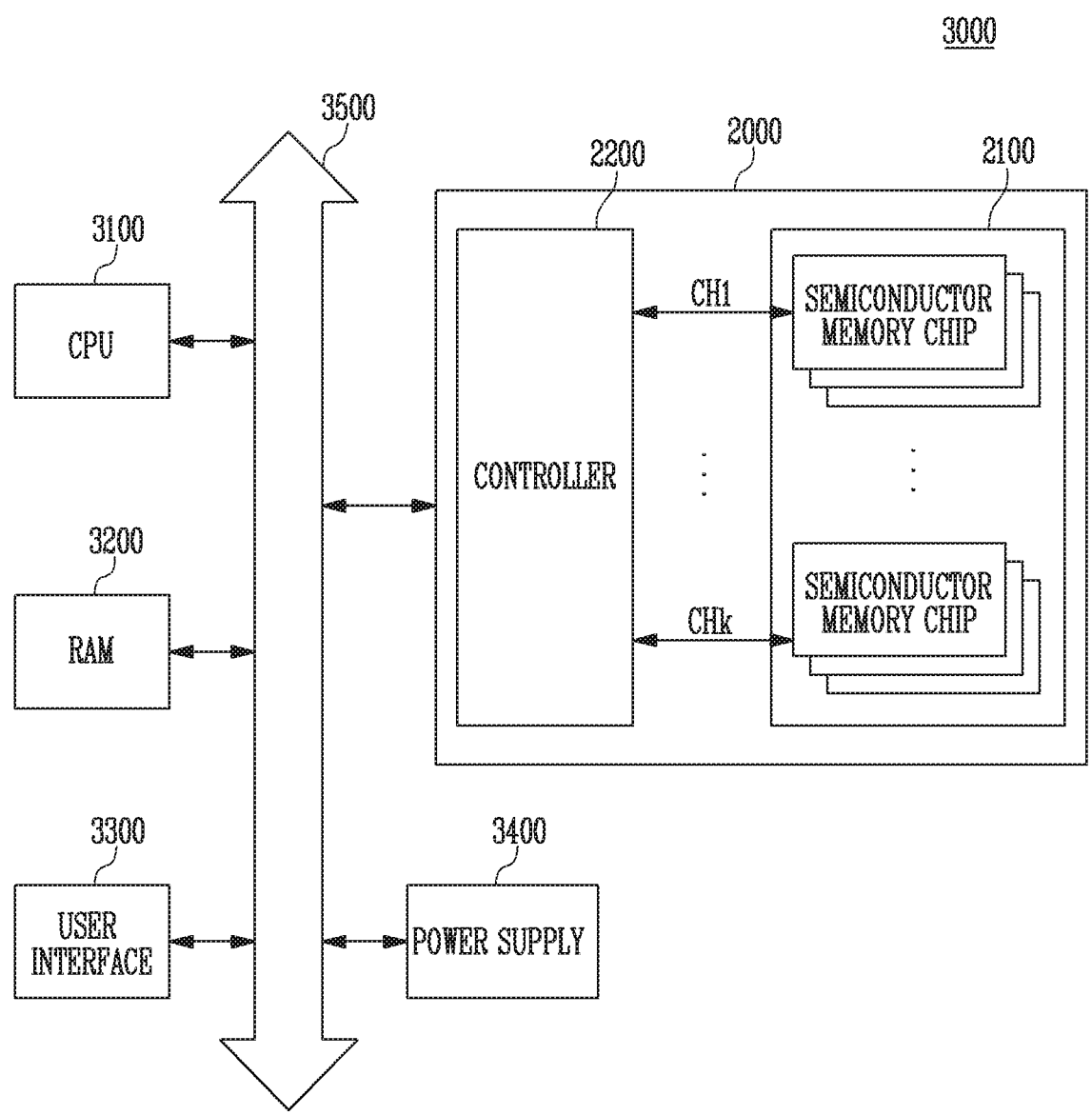
FIG. 9 is a block diagram illustrating an example of computing system including the memory system described with reference to FIG. 8.

FIG. 9 is a block diagram illustrating a computing system 3000 including the memory system 2000 described with reference to FIG. 8.

Referring to FIG. 9, the computing system 3000 may include a central processing unit (CPU) 3100, a RAM 3200, a user interface 3300, a power supply 3400, a system bus 3500, and a memory system 2000.

The memory system 2000 may be electrically coupled to the CPU 3100, the RAM 3200, the user interface 3300, and the power supply 3400 through the system bus 3500. Data provided through the user interface 3300 or processed by the CPU 3100 may be stored in the memory system 2000.

In FIG. 9, the semiconductor memory device 2100 is illustrated as being coupled to the system bus 3500 through the controller 2200. However, the semiconductor memory device 2100 may be directly coupled to the system bus 3500. The function of the controller 2200 may be performed by the CPU 3100 and the RAM 3200.

In FIG. 9, a memory system 2000 described with reference to FIG. 8 is illustrated. However, in another embodiment, the memory system 1000 described with reference to FIG. 1 may be used instead of the memory system 2000. In yet another embodiment, the computing system 3000 may be formed of both the memory systems 1000 and 2000.

In various embodiments of the present disclosure, during the operation of a memory system, metadata obtained by compressing map data may be managed using a map data loading buffer. Consequently, the map data may be efficiently managed.

Various embodiments are disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
   a semiconductor memory device to which an address mapping table including a plurality of map segments is stored; and
   a controller configured to load and store, during a read operation, one or more map segments selected from among the plurality of map segments,
   wherein the controller comprises:
   a compression engine configured to compress the one or more map segments and generate one or more compressed map segments and metadata corresponding thereto;
   a map data loading buffer configured to store the one or more compressed map segments and the metadata; and
   a processor configured to store the one or more compressed map segments to a random access memory (RAM) using the metadata.

2. The memory system according to claim 1, wherein the map data loading buffer comprises:
   a main slot unit configured to store the one or more compressed map segments; and
   a sub-slot unit configured to store the metadata.

3. The memory system according to claim 2, wherein the main slot unit comprises a plurality of main slots, each configured to store one of the one or more compressed map segments.

4. The memory system according to claim 3,
   wherein the sub-slot unit comprises a plurality of sub-slots respectively corresponding to the plurality of main slots, and
   wherein each of the plurality of sub-slots is configured to store metadata corresponding to the compressed map segment stored in the corresponding one of the plurality of main slots.

5. The memory system according to claim 4, wherein the metadata stored in one of the plurality of sub-slots includes information about a size of the corresponding compressed map segment.

6. The memory system according to claim 1,
   wherein the controller further comprises the RAM configured to store the one or more compressed map segments stored in the map data loading buffer, and
   wherein the processor checks sizes of the one or more compressed map segments stored in the map data loading buffer using the metadata and allocates a space corresponding to the sizes of the one or more compressed map segments to the RAM, and then copies and stores the one or more compressed map segments to the allocated space of the RAM.

7. The memory system according to claim 1, wherein the controller further includes a decompression engine configured to decompress the one or more compressed map segments stored in the RAM and generate one or more decompressed map segments.

8. The memory system according to claim 7, wherein the processor controls the decompression engine to select and decompress at least one compressed map segment including a logical to physical (L2P) entry corresponding to a read address, among the one or more compressed map segments stored in the RAM.

9. The memory system according to claim 7, wherein the one or more decompressed map segments are stored to the RAM.

10. The memory system according to claim 9, wherein the processor controls the semiconductor memory device to check a read address with reference to L2P entries of the one or more decompressed map segments and read data stored in the checked read address.

11. A memory system comprising:
    a semiconductor memory device to which an address mapping table including a plurality of map segments is stored; and
    a controller configured to control the semiconductor memory device to store, during a read operation, one or more compressed map segments obtained through a compression operation of compressing one or more map segments, selected from among the plurality of map segments, and metadata obtained during the compression operation, to a map data loading buffer,
    wherein the metadata corresponding to the one or more compressed map segments includes information about a size of the one or more compressed map segments corresponding thereto.

12. The memory system according to claim 11, wherein the controller comprises:
    a compression engine configured to compress the selected one or more map segments and generate the one or more compressed map segments and the metadata;
    a map data loading buffer configured to store the one or more compressed map segments and the metadata;
    a random access memory (RAM) to which the one or more compressed map segments stored in the map data loading buffer are copied and stored; and
    a processor configured to allocate a space of the RAM using the metadata, and copy and store the one or more compressed map segments to the allocated space of the RAM.

13. The memory system according to claim 11, wherein the map data loading buffer comprises:
    a main slot unit configured to store the one or more compressed map segments; and
    a sub-slot unit configured to store the metadata.

14. The memory system according to claim 13, wherein the main slot unit comprises a plurality of main slots, each configured to store one of the one or more compressed map segments.

15. The memory system according to claim 14,
    wherein the sub-slot unit comprises a plurality of sub-slots respectively corresponding to the main slots, and
    wherein each of the sub-slots is configured to store metadata corresponding to the compressed map segment stored in the corresponding one of the main slots.

16. The memory system according to claim 15, wherein the metadata is stored in one of the plurality of sub-slots.

17. A method of operating a memory system, comprising:
    loading map segments stored in a semiconductor memory device using a controller;
    compressing the loaded map segments using a compression engine, generating compressed map segments and metadata respectively corresponding to the compressed map segments, and storing the compressed map segments and the metadata to a map data loading buffer; and
    allocating, using a processor, a space of a random access memory (RAM) in response to the metadata, and copying and storing the compressed map segments to the allocated space.

18. The method according to claim 17, wherein the metadata includes information about sizes of the compressed map segments.

* * * * *